Figure 1:
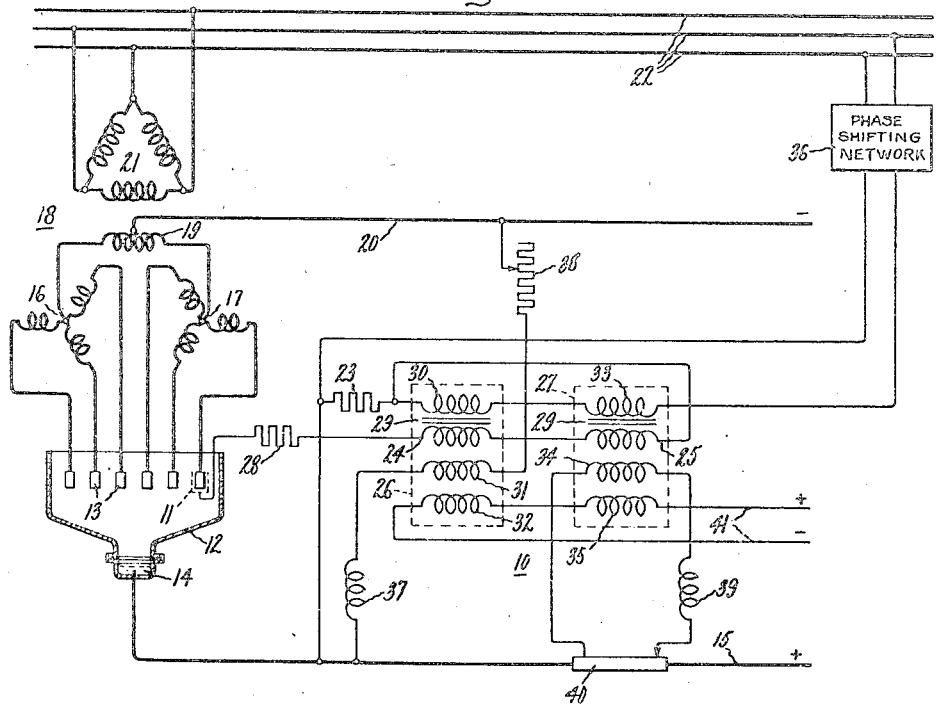

Patented Mar. 2, 1948

2,437,066

UNITED STATES PATENT OFFICE 2,437,066

ELECTRIC CONTROL CIRCUIT

Georges Belfils, Belfort, France, assignor to General Electric Company, a corporation of New York Application December 31, 1942, Serial No. 471,808
In France August 5, 1941

8 Claims. (Cl. 175—363)

1

My invention relates to electric control circuits and more particularly to improved control circuits for regulating certain operating conditions of electric valve apparatus.

It is often desirable to regulate electric translating apparatus including electric valve means selectively in accordance with a plurality of different operating conditions of the translating apparatus. For example, it may be desirable to maintain a relatively constant voltage of the output circuit for a predetermined range of load current and for limiting the current to a predetermined maximum value independently of the voltage. Numerous circuits have been devised for producing this type of regulation. However, for the most part, the known circuits for regulation of this type have been rather complicated and required a large amount of equipment for producing the desired selective regulation. In accordance with the teachings of my invention, I provide a new and improved and very simple electric control circuit for electric translating apparatus including electric valve means which effects the selective regulation of a plurality of output conditions.

It is an object of my invention to provide a new and improved electric regulating circuit.

It is another object of my invention to provide a new and improved control circuit of simple design which automatically regulates the output of electric valve apparatus in accordance with a plurality of electrical conditions.

In accordance with the illustrated embodiment of my invention, the control members of an electric valve rectifier are each provided with an improved excitation circuit including a plurality of saturable inductive devices which are respectively energized in accordance with one of the electrical conditions to be controlled. The excitation circuit and the saturable devices are, in general, of the character described and claimed in the copending Augier application, Serial No. 471,809, filed December 31, 1942, now Patent No. 2,428,604, issued October 7, 1947, and assigned to the assignee of the present application. In the present application, one of the saturable devices is controlled in accordance with the output voltage of the rectifier and the other of the devices is energized in accordance with the output current. As a result of the arrangement of the control windings, the device which regulates in accordance with voltage is arranged to become completely saturated and totally ineffective when the load current reaches a predetermined maximum value. At this value of current, or a higher

2 value if desired, the saturable device which regulates in accordance with current is saturated for less than the entire cycle of alternating-current voltage supplied thereto and operates to retard the phase of the excitation as the load current tends to increase and, in this way, to maintain the load current constant at the predetermined maximum value.

My invention will be better understood by reference to the following description taken in connection with the accompanying drawing and its scope will be pointed out in the appended claims. In the drawing, Fig. 1 is a schematic representation of one embodiment of my invention and Fig. 2 illustrates diagrammatically certain operating characteristics of the embodiment of my invention illustrated in Fig. 1.

In the following description of the illustrated embodiment of my invention, it will be assumed that the electric valve translating apparatus is operating as a rectifier and that the improved control circuit embodying my invention operates to regulate the output voltage for a given range of load current and to regulate the current thereafter, or in other words, to establish an upper limit of load current. It will be understood by those skilled in the art that my invention in its broader aspects is applicable to other types of electric translating apparatus employing electric valve means and that the selective control may be accomplished in accordance with any desired electrical conditions.

Figure 2:
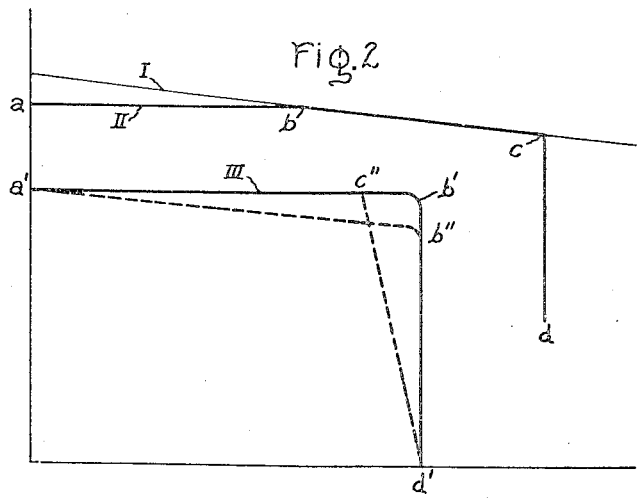

Referring now to Fig. 1 of the drawing, I have shown my invention embodied in a control circuit illustrated generally by the numeral 10 for controlling the energization of one of the control members 11 of an electric valve means 12 which, as illustrated, is of the type utilizing a gas or vapor and comprising, in addition to the control members 11, a plurality of anodes 13 and a cathode 14 of conducting liquid. While only one of the control members has been illustrated, it will be understood that a similar control member is associated with each of the anodes 13. As the description proceeds, it will be apparent that the invention is equally applicable to electric valves employing starting electrodes of the make-alive type.

Referring again to Fig. 1, electric valve means 12 is arranged in the load circuit with the cathode 14 thereof connected with one conductor 15 of the direct-current circuit and with the anode connected with the phase terminals of transformer secondary windings 16 and 17 of a transformer 18 and having the neutral terminals thereof interconnected by an innerphase transformer 19. The midpoint on the innerphase transformer is connected with the other direct-current conductor 20. The primary winding 21 of the transformer 18 is connected to be energized from a polyphase alternating-current supply circuit 22.

Referring now particularly to the excitation circuit 10 for the control member 11, it will be noted that the cathode-to-control-member circuit includes an impedance element, such as a resistor 23, the alternating-current windings 24 and 25 of saturable inductive devices 26 and 27, and a current-limiting resistor 28. The saturable inductive devices 26 and 27 are preferably of the type described in the above-mentioned copending application and each comprises a core structure 29 formed of magnetic material having high permeability, such as Permalloy or Mumetal, and including additional windings 30, 31, and 32 and 33, 34, and 35, respectively. The windings 30 and 33 are connected in series with the resistor 23 and the series circuit connected to be energized from a suitable source of alternating-current voltage. As illustrated, the windings 30, 33, and resistor 23 are energized from the output of a phase-shifting network 36 which is connected with one phase of the alternating-current supply circuit 22. Winding 31 is connected across the conductors 15 and 20 of the direct-current circuit through a smoothing inductance 37 and an adjustable resistor 38. The winding 34 of the device 26 is connected through a smoothing inductance 39 to the terminals of a shunt 40 connected in the direct-current line 15. The windings 32 and 35 are connected in series and to a suitable source of direct-current voltage, not shown, by conductors 41. The windings 32 and 35 provide means for introducing unidirectional magnetomotive forces in the core structures of devices 26 and 27 which are opposed by unidirectional magnetomotive forces produced by windings 30 and 34, respectively, which are variably energized in accordance with the output voltage and output current, respectively. The windings 30 and 31 have a sufficiently large number of turns so that the magnetomotive force produced in the core structure by a relatively small change in the load voltage or load current is sufficient to saturate completely the associated core structure. This makes it possible, as will be more apparent when the operation of the system is described, to maintain substantially constant voltage over a wide range of load current and to regulate the current at a predetermined maximum value thereafter.

The features and advantages that characterize my invention will be better understood by a consideration of the operation of the illustrated embodiment thereof with particular reference to the load voltage-load current characteristic curves of Fig. 2. The curve I is the unregulated output characteristic of the circuit of Fig. 1 when operating as a rectifier. Curve II represents the output characteristic of the circuit of Fig. 1 when controlled in accordance with my invention. During the region $a-b$, the device 27 is completely saturated by the preponderance of the unidirectional magnetomotive force produced by the biasing winding 35 as compared with the variably energized current control winding 34. During this same interval, the device 26 is unsaturated during variable portions of each cycle of the voltage of the supply circuit 22 to produce a steep wave front voltage across the resistor 23 at variable times in the supply circuit voltage cycle. In other words, during the region $a-b$, the system operates simply as a voltage regulator in the manner described in the above-identified copending application. This operation may be described briefly as follows: During the portion of the voltage cycle of circuit 22 that device 26 is unsaturated, substantially all of the voltage appears across the winding 24. During this same period, a voltage is induced in the winding 30 which has a negative polarity with respect to the control member 11 to provide a hold-off voltage. At the instant in the voltage wave of the alternating-current supply circuit that the core structure 29 of the device 26 saturates, the voltage across resistor 23 rises rapidly to impress a positive voltage on control member 11 and render the associated discharge path conductive. At this same instant, the voltage across winding 30 reduces substantially to zero. As the load current increases in the region $a-b$, the voltage tends to drop. This decreases the energization of the control winding 31 and increases the net unidirectional magnetization of the core structure 29 resulting from the control winding 31 and the biasing winding 32 so that the instant in the supply circuit voltage wave that the device 26 saturates is advanced to maintain the output voltage substantially constant. At point $b$, the reduction in voltage is sufficient to cause the core structure of device 26 to be saturated throughout the voltage cycle of the supply circuit, thus rendering the voltage-regulator circuit ineffective. If the biasing winding 35 and control winding 34 of the current regulator are proportioned so that the device 27 remains saturated throughout the entire alternating-current voltage cycle, for currents in the range $b-c$, the curve II will coincide with the natural regulation curve I between these points. During this interval $b-c$, when the devices 26 and 27 are both continuously saturated, the voltage impressed on the control member 11 by the resistor 23 is a sinusoidal voltage substantially in phase with the anode-cathode voltage of the associated discharge path and the rectifier operates in the same manner as an uncontrolled rectifier. If at point $c$, the unidirectional magnetization of the core structure of device 27 resulting from the difference in ampere turns produced by windings 34 and 35 is insufficient to maintain the core structure saturated throughout the entire alternating-current voltage cycle, the device 27 will regulate in accordance with current, tending to maintain substantially constant current as illustrated by portion $c-d$ of curve II. It will be understood that the incremental increase in the load current will reduce the net unidirectional magnetization of the core structure 29 of device 27 and retard the phase of the peak wave voltage across the impedance 23 to maitnain the current substantially constant. After the point $b$ on curve II, the core structure of the device 26 is completely saturated throughout the entire alternating-current voltage cycle so that the impedance of its alternating-current windings is reduced substantially to zero and the current regulator 27 functions as if it were connected alone in the circuit. The solid curve III illustrates the voltage-current characteristic of a rectifier when the control and biasing windings 34 and 35 of the current regulator 27 are arranged so that the device 27 takes over control immediately after the device 26 becomes saturated during the entire alternating-current voltage cycle. Thus, when the system is operating in accordance with the curve III, the voltage regulator is effective in the region $a'$—$b'$ and the current regulator is effective in the region $b'$—$d'$.

It will be readily understood that the system may be arranged to operate with the voltage-regulated and current-regulated portions of the characteristic departing more or less from the horizontal and vertical curves, respectively, indicated in curves I and II, in the manner illustrated by the dotted portions of the curve III illustrated at $a'$—$b''$ and $c''$—$d'$.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, at least one of said circuits being an alternating-current circuit, electric translating apparatus interconnecting said circuits including electric valve means having a control member, a control circuit for energizing said control member to control the transfer of energy between said circuits comprising a supply of alternating voltage having the same frequency as said alternating-current circuit, an impedance, a pair of saturable inductance devices each including an impedance winding and a control winding, means connecting said impedance windings and said impedance in series and across said supply of alternating voltage, means connecting said impedance in circuit with said control member, and means for energizing said control windings respectively in accordance with different electrical conditions to regulate said valve means selectively in accordance with said conditions.

2. In combination, a supply circuit, a load circuit, at least one of said circuits being an alternating-current circuit, electric translating apparatus interconnecting said circuits including electric valve means having a control member, a control circuit for energizing said control member to control the transfer of energy between said circuits comprising a supply of alternating voltage having the same frequency as said alternating-current circuit, a resistor, a pair of saturable inductive devices each including an impedance winding and a control winding, means connecting said impedance windings and said resistor in series and across said supply of alternating voltage, means connecting said resistor in circuit with said control member, and means for energizing said control windings respectively in accordance with the voltage and current of said load circuit to regulate said valve means selectively in accordance with said load voltage and load current.

3. In combination, a supply circuit, a load circuit, at least one of said circuits being an alternating-current circuit, electric translating apparatus interconnecting said circuits including electric valve means having a control member, an excitation circuit for controlling the energization of said control member to regulate the operation of said valve means in accordance with load voltage during a range of values of load current and for regulating said valve means in accordance with load current when the load current tends to exceed a predetermined value comprising a plurality of saturable inductive devices each having an impedance winding and a core structure, and means for saturating said core structures over variable portions of the voltage cycle of said alternating-current circuit respectively in accordance with the voltage and current of said load circuit.

4. In combination, a supply circuit, a load circuit, at least one of said circuits being an alternating-current circuit, electric translating apparatus interconnecting said circuits including electric valve means having a control member, an excitation circuit for controlling the energization of said control member to regulate the operation of said valve means in accordance with load voltage during a predetermined range of values of load current and for regulating said valve means in accordance with load current when the load current tends to exceed a predetermined value comprising a plurality of saturable inductive devices each having an impedance winding and a core structure, means for saturating said core structures over variable portions of the voltage cycle of said alternating-current circuit respectively in accordance with the voltage and current of said load circuit, said last-mentioned means and said core structures being designed to produce saturation of one of said core structures throughout the entire positive half cycle of voltage of said alternating-current circuit when said load current has a value within said range of values and to produce saturation of the other of said core structures throughout the entire positive half cycle of voltage of said alternating-current circuit for values of load current outside of said range, and means for impressing on said control member a voltage dependent upon the condition of saturation of both of said devices.

5. In combination, a supply circuit, a load circuit, at least one of said circuits being an alternating-current circuit, electric translating apparatus interconnecting said circuits including electric valve means having a control member, a control circuit for energizing said control member to control the transfer of energy between said circuits comprising a pair of saturable inductive devices each including a winding and a core structure, means for impressing on said winding a voltage having a frequency of said alternating-current circuit, means for impressing a unidirectional magnetomotive force on the core structure of one of said devices which varies in accordance with the magnitude of the load circuit voltage, means for impressing a unidirectional magnetomotive force on the core structure of the other of said devices which varies in accordance with the magnitude of the load circuit current, and means for impressing a voltage on said control member dependent upon the condition of saturation of both said core structures to regulate said valve means selectively in accordance with said load voltage and load current to provide a regulated voltage output for a range of load currents and a regulated current output outside said range.

6. In combination, a supply circuit, a load circuit, at least one of said circuits being an alternating-current circuit, electric translating apparatus interconnecting said circuits including electric valve means having a control member, a control circuit for energizing said control member to control the transfer of energy between said circuits comprising a pair of saturable inductive devices each including a winding and a core structure, means for impressing on said winding a voltage having a frequency of said alternating-current circuit, means for impressing a unidirectional magnetomotive force on the core structure of one of said devices which varies in accordance with the magnitude of a predetermined electrical condition of said load circuit, means for impressing a magnetomotive force on the core structure of the other of said devices which varies in accordance with the magnitude of a second predetermined electrical condition of said load circuit, and means for impressing a voltage on said control member dependent upon the condition of saturation of both said core structures to regulate said valve means selectively in accordance with the magnitudes of said electrical conditions.

7. In combination, an alternating-current supply circuit, a load circuit, electric translating apparatus interconnecting said circuits including electric valve means having a control member, an impedance element, a pair of inductive devices each including a core structure, an alternating-current winding, and a pair of control windings, means connecting the alternating-current windings of said inductive devices and said impedance element in series, means for impressing a voltage derived from said alternating-current circuit on said series windings and element, means for impressing on one control winding of each of said devices a unidirectional voltage of predetermined magnitude, means for impressing on the other control winding of one of said devices a voltage which varies in accordance with the voltage of said load circuit, means for impressing on the other control winding of the other of said devices a voltage which varies in accordance with the current of said load circuit, and means connecting said impedance element in circuit with said control member, said core structures, said windings, and the voltages impressed thereon being so correlated that the core structure of said one of said devices becomes saturated at variable points in the voltage wave of said alternating-current circuit as said load voltage varies over a predetermined range of load current magnitudes and the core structure of the other of said devices becomes saturated at variable points in the voltage wave of said alternating-current circuit as the current varies when said load current is outside said range.

8. In combination, an alternating-current supply circuit, a load circuit, electric translating apparatus interconnecting said circuits including electric valve means having a control member, an impedance element, a pair of inductive devices each including a core structure, an alternating-current winding, and a pair of control windings, means connecting the alternating-current windings of said inductive devices and said impedance element in series, means for impressing a voltage derived from said alternating-current circuit on said series windings and element, means for impressing on one control winding of each of said devices a unidirectional voltage of predetermined magnitude, means for impressing on the control winding of one of said devices a voltage which varies in accordance with the voltage of said load circuit, means for impressing on the other control winding of the other of said devices a voltage which varies in accordance with the current of said load circuit, and means connecting said impedance element in circuit with said control member to impress thereon a steep wave front voltage which varies in phase in accordance with load voltage and load current, respectively, during different load conditions.

GEORGES BELFILS.

REFERENCES CITED

The following references are of record in the file of this patent:

UNITED STATES PATENTS

| Number | Name | Date |
|---|---|---|
| 2,103,997 | Bedford | Dec. 28, 1937 |
| 2,246,173 | Herskind | June 17, 1941 |

FOREIGN PATENTS

| Number | Country | Date |
|---|---|---|
| 412,614 | Great Britain | July 2, 1934 |